July 26, 1966     A. O. JANSSON     3,262,663

WIRING FASTENERS

Filed Nov. 2, 1965

Inventor:
Arnold O. Jansson,
by James R O'Connor
Atty.

United States Patent Office 3,262,663
Patented July 26, 1966

3,262,663
WIRING FASTENERS
Arnold O. Jansson, Arlington, Mass., assignor to United-Carr Incorporated, Boston, Mass., a corporation of Delaware
Filed Nov. 2, 1965, Ser. No. 506,036
3 Claims. (Cl. 248—74)

This invention relates to an improved fastening system for securing wires, tubes, cables and the like articles to a supporting sheet metal panel.

An object of the invention is to provide a simple, inexpensive, easily installed and highly efficient fastening system for securing articles to a supporting metal panel.

A further object of the invention is to provide a fastening system for securing articles to a sheet metal panel wherein the male component of the system is adapted to be attached to the panel without perforation thereof.

Another object of the invention is to provide a fastening system wherein at least one of the components may be secured to the supporting panel prior to painting or otherwise finishing same and the article-holding component of the system may be later secured to the panel without marring or scratching the finish.

A still further object of the invention is to provide a fastening system wherein the article-holding component is electrically nonconductive.

Other objects and advantages of the novel fastening system will become evident from a reading of the following detailed description in conjunction with a viewing of the accompanying drawing in which.

Figure 1:
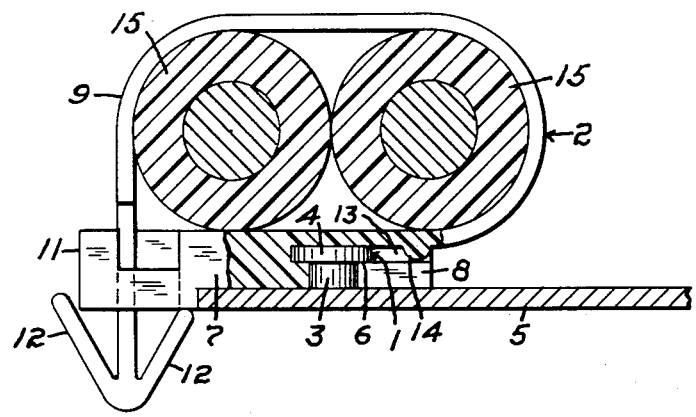
FIG. 1 is a side view partly in section of an installation depicting the fastening system as employed to secure a pair of cables to a supporting panel.
Figure 2:
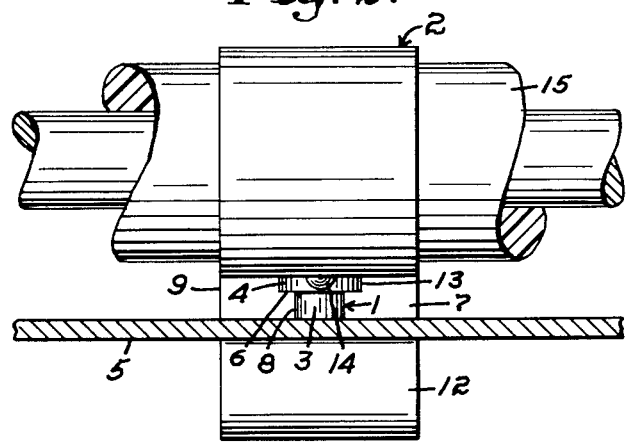
FIG. 2 is a right end view of the installation shown in FIG. 1.
Figure 3:
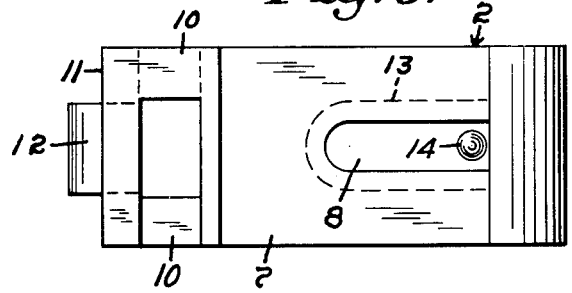
FIG. 3 is a bottom plan view of the article-holding clip shown in FIGS. 1 and 2.

The fastening system comprises a metal stud member 1 and a molded plastic, for example, "Delrin" article-holding female clip 2.

The stud 1 includes a shank 3 and a generally circular head 4. The shank 3 is adapted to be fusedly connected by welding or some other means to the sheet metal supporting panel 5 at the end of the shank opposite the head 4, such that the head is spaced from but lies close to the surface of the panel 5 and the under surface 6 of the head 4 faces inwardly towards the surface of the panel 5. It should be understood that any number of studs may be secured to the panel at spaced intervals and this may desirably be accomplished prior to the finishing or painting of the panel 5.

The clip 2 includes a base structure 7 having an elongated stud-receiving slot 8 opening at one end thereof and an article-engaging, flexible band 9 extending upwardly from the end of the base structure adjacent the slot 8. Cooperating band locking means are provided by an open end socket at the end of the base structure remote from the slot 8 and an arrow head termination at the normally free end of the band 9. The socket is formed by a pair of spaced side bars 10 extending outwardly from the base structure 7 and an end bar 11 connecting the side bars 10. The arrow head termination on the band 9 includes a pair of inwardly flexible, angular wings 12.

The depth of the slot 8 is approximately equal to the height of the stud 1 and its width is approximately equal to the diameter of the stud shank 3. The undercut 13 having a width at least as great as the diameter of the stud head 4 is provided in the base structure 7 adjacent the upper end of the slot 8 and a flexible, compressible stud-locking projection or semi-spherical boss 14 depends from the upper portion of the base structure 7 into the slot 8 to the depth of the undercut 13.

The clip 2 is secured to the panel 5 by inserting the stud 1 into the slot 8 and the undercut 13 after the stud has been welded to the panel 5. As the stud head 4 enters the undercut the projection 14 is flexed and compressed until the head is beyond it whereupon it resiliently returns to the position shown in the drawings to prevent accidental disengagement of the clip from the stud.

Once the clip is secured to the panel the insulated cables 15 (or any other article) are secured to the panel by passing the flexible band 9 over them and forcing the arrow head termination on the band through the socket. The flexible side wings 12 thereafter engage the undersurface of the base structure 7 and the end bar 11 to lock the band about the cables 15.

While the particular cable-holding means shown in the drawing has been chosen for purposes of illustration, it is to be understood that that portion of the clip might be substantially modified without departing from the scope of the inventive concept disclosed in the over-all fastener combination which is best defined by the following claims.

I claim:

1. A fastener combination for securing wires, tubes, cables and the like articles to a supporting sheet metal panel comprising a stud having a head and a shank adapted to be secured to a surface of the supporting panel at the end of the shank remote from the head without perforation of the panel whereby the head of the stud will be spaced from but lie in close proximity to the surface of the panel with the undersurface of the head facing inwardly toward the surface of the panel, and a clip adapted to engage the head of the stud after the shank has been affixed to the panel such that the stud will be fully concealed from view, said clip comprising a base structure having an elongated slot formed in the underportion thereof and an undercut formed adjacent said slot, said slot and said undercut opening at one longitudinal end of the base structure to permit insertion of the stud head into the undercut and the stud shank into said slot after the stud has been affixed to the panel, stud retaining means depending from the upper portion of said base structure into said slot, said stud-retaining means being resiliently displaceable by the stud as the latter is inserted into the base structure and thereafter resiliently expansible to return to its original position whereby the stud is prevented from becoming accidentally disengaged from the base structure, a flexible band extending upwardly from said base structure adjacent said slot, said band being adapted to be passed over an article to be secured to the supporting panel, and cooperating locking means disposed at the end of the band remote from the base structure and the end of the base structure remote from the slot for anchoring said band to the base structure.

2. A fastener combination according to claim 1 wherein the co-operating locking means for anchoring the band includes a pair of integral, flexible, angularly disposed side wings forming an arrow head termination at the end of the band, and an extension at the end of the base structure remote from the slot, said extension including a pair of side bars extending away from the base structure and an end bar connecting said side bars in spaced parallel relationship to said base structure, said side bars defining a socket opening adapted to snappingly receive the arrow head termination on said band.

3. A fastener combination according to claim 1 wherein the stud-retaining means is an integral boss having a semispherical configuration.

References Cited by the Examiner

UNITED STATES PATENTS 3,210,030  10/1965  Ramsey et al. _____ 248—71

CLAUDE A. LE ROY, *Primary Examiner.*